Nov. 21, 1939.   C. F. SMITH   2,180,437
PIPE CLEANER
Filed Sept. 18, 1936
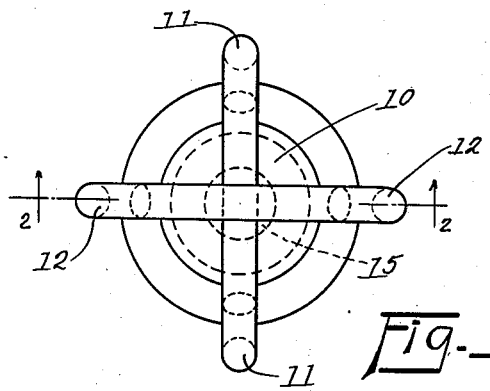
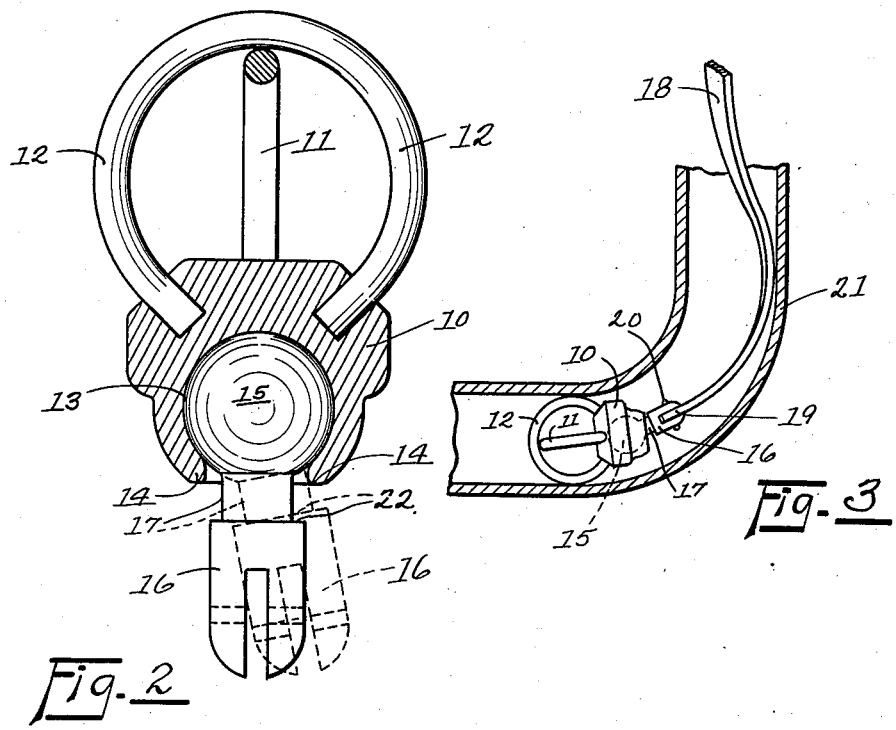
Witness:
Geo L. Chapel
INVENTOR.
Clifford F. Smith.
BY Rice and Rice
ATTORNEYS.

UNITED STATES PATENT OFFICE 2,180,437

PIPE CLEANER

Clifford F. Smith, Sioux Falls, S. Dak., assignor to Wolverine Brass Works, Grand Rapids, Mich., a corporation of Michigan Application September 18, 1936, Serial No. 101,376

4 Claims. (Cl. 15—104.30)

The instant invention relates to pipe cleaners and more particularly to a pipe cleaner which is especially well adapted for cleaning sedimentary deposits from waste water pipes.

The primary objects of the present invention are to provide a pipe cleaner of the general character above indicated having a ball and socket joint between the head and the cable portion thereof; to provide such a pipe cleaner whose socket portion is provided with an external shoulder adapted to engage within an annular groove in the shank of the ball portion for relieving the strain on the ball and socket joint in instances wherein the thrust between the ball and its socket is at an angle; and, to provide such a pipe cleaner which is economical in manufacture, utilitarian in use and which has novel features over that of the universal joint pipe cleaner shown and described in United States Letters Patent No. 1,435,277 issued November 14, 1922, to Albert A. Brooks.

An illustrative embodiment of the invention is shown in the accompanying drawing wherein:

Figure 1 is a top plan view of the pipe cleaner;

Figure 2 is an enlarged sectional view thereof on line 2—2 of Figure 1, the shank portion of the ball forming a part of the ball and socket joint being shown in dotted lines as swung to one extreme position; and Figure 3 is a view showing the manner in which the pipe cleaner is forced through a curved piece of waste water piping when it is desired to rid the piping of sedimentary deposits therein.

Referring then to the drawing in which like parts of the device shown are designated by the same numerals in the several views, the pipe cleaner there shown comprises a head having a base portion 10 of any suitable material and a pair of outwardly projecting bowed members 11, 12 here shown as crossing each other transversely at an angle, whose respective opposite ends are secured to or are integral with the base portion.

The base portion 10 of the head is provided with a spherical socket 13 open at the end thereof opposite the bowed portions 11, 12 and circumscribed by an external peripheral flange 14.

A ball 15 disposed within the socket 14 and rotatably embraced by the walls thereof is provided with a cable coupling shank 16 which is provided with an annular groove 17 adjacent its connection with the ball 15.

A flexible cable 18, preferably flat as shown in Figure 3, has a coupling connection 19 adapting it to be detachably coupled with the coupling shank 16 in any suitable manner as by the pin 20 passing through the apertured coupling connection 19 and the shank 16.

Waste water pipes 21 and the like in which sedimentary deposits have accumulated may thus be cleaned with a minimum of friction by forcing the pipe cleaner head 10 therethrough, the bowed portions 11, 12 thereof cutting and scraping the inner walls of the pipe 21 during the permissible rotation of the head 10 and its coupling shank 16 which operation is more efficient than is the operation of the limited universal joint connection 21 between the head 20 and the coupling shank 18 of the pipe cleaner of the prior patent referred to above.

As shown in dotted lines in Figure 2 wherein the coupling shank 16 is rotated at angle to the head 10 in instances wherein the head 10 is being forced through a curved pipe 21 as indicated in Figure 3, the annular groove 17 engages the peripheral flange 14 to strengthen and reinforce the ball and socket joint against buckling and relieve it of undue strain. Deposits of sediment cut and scraped from the inner walls of the pipe may thus be flushed through and past the open head of the pipe cleaner.

It will thus be seen that the pipe cleaner herein shown and described is economical in manufacture, utilitarian in use, and has novel features over the pipe cleaner shown and described in the prior patent referred to above.

While but one specific embodiment of the invention has been shown and described herein, it will be understood that certain of the details of the construction shown may be altered or omitted without departing from the spirit of the invention defined in the following claims.

I claim:

1. In a device of the class described, a base member provided with a spherical socket and having a pair of forwardly projecting pipe cleaning bowed members crossing each other at an angle, and a ball universally turnably disposed within the socket provided with a rearwardly projecting cable connecting shank.

2. In a device of the class described, a base member provided with an open spherical socket circumscribed by a rearwardly projecting peripheral flange and having a pair of forwardly projecting pipe cleaning bowed members crossing each other at an angle, and a ball universally turnably disposed within the socket provided with a rearwardly projecting cable connecting shank having an annular groove adjacent the ball adapted to permissively engage said flange.

3. In a device of the class described, a base member provided with an open spherical socket circumscribed by a rearwardly projecting peripheral flange, a pair of forwardly projecting circularly bowed members having their rearward ends set into said base member and their forward ends crossing each other at substantially right angles; a ball universally turnably disposed within the socket provided with a rearwardly projecting shank having an annular groove adjacent the ball adapted to permissively engage said flange, said shank having also a pin detachably mounted therein and adapting the shank for detachable pivotal connection to a flexible cable.

4. In a device of the class described, a base member provided with an open spherical socket circumscribed by a rearwardly projecting peripheral flange, a pair of forwardly projecting circularly bowed members having their rearward ends set angularly inwardly into said base member and their forward ends crossing each other at substantially right angles; a ball universally turnably disposed within the socket provided with a rearwardly projecting shank having an annular groove adjacent the ball adapted to permissively engage said flange, said shank having also a pin detachably mounted therein and adapting the shank for detachable pivotal connection to a flexible cable.

CLIFFORD F. SMITH.